W. RACE & S. R. C. MATHEWS, (N. RACE administratrix of W. RACE, deceased,) assignors, by mesne assignments, to S. R. C. MATHEWS, RICHARD WOOD, E. R. WOOD, G. WOOD, RANDOLPH WOOD, (I. H. JOHNSON administrator of said RANDOLPH WOOD, deceased,) and W. WOOD.

HYDRANT.

No. 10,452. Reissued Feb. 26, 1884.

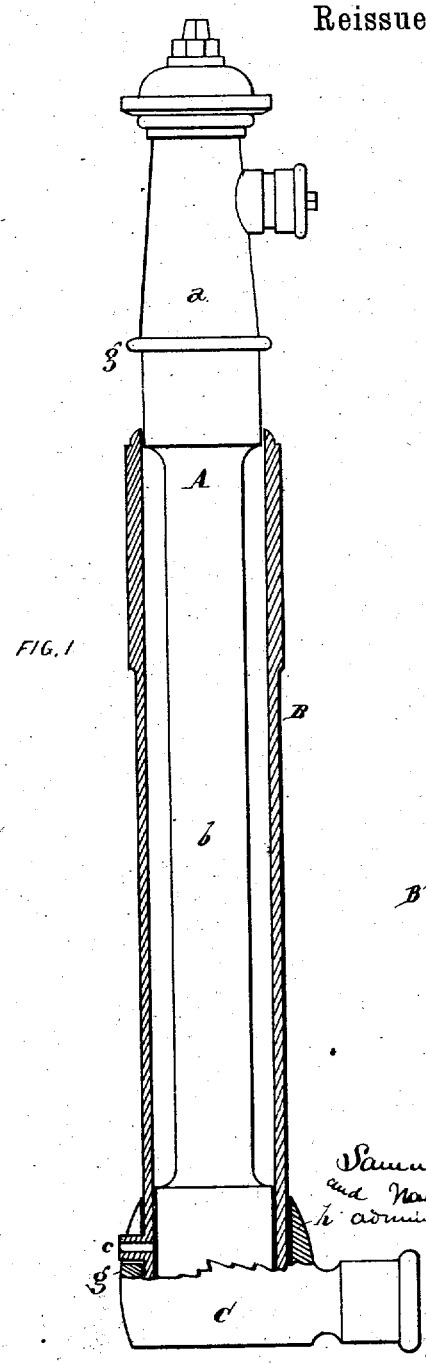

FIG. 1

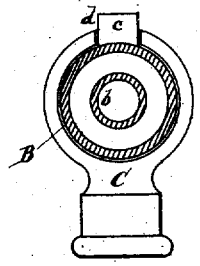

FIG. 2

Attest
L. J. Mates
[illegible]

Inventors
Samuel R. C. Mathews
and Nancy Race
Administratrix of
Washburn Race (deceased)
By their atty
[illegible]

THE NORRIS PETERS CO., WASHINGTON, D. C.

UNITED STATES PATENT OFFICE.

NANCY RACE, OF VOLNEY, NEW YORK, (ADMINISTRATRIX OF WASHBURN RACE, DECEASED,) AND SAMUEL R. C. MATHEWS, OF PHILADELPHIA, PENNSYLVANIA; SAID WASHBURN RACE AND MATHEWS ASSIGNORS, BY MESNE ASSIGNMENTS, TO S. R. C. MATHEWS, RICHARD WOOD, EDWARD R. WOOD, GEORGE WOOD, RANDOLPH WOOD, (I. H. JOHNSON ADMINISTRATOR OF SAID RANDOLPH WOOD, DECEASED,) AND WALTER WOOD, ALL OF PHILADELPHIA, PENNSYLVANIA.

HYDRANT.

SPECIFICATION forming part of Reissued Letters Patent No. 10,452, dated February 26, 1884.

Original No. 96,959, dated November 16, 1869. Application for reissue filed October 31, 1882.

*To all whom it may concern:*

Be it known that WASHBURN RACE, (deceased,) of Lockport, county of Niagara, State of New York, represented by NANCY RACE, administratrix, of the town of Volney, county of Oswego, and State of New York, and SAMUEL R. C. MATHEWS, of the city and county of Philadelphia, State of Pennsylvania, formerly of Lockport, New York, did invent an Improvement in Hydrants, of which the following is a specification.

The invention has reference to hydrants; and it consists in improvements upon Letters Patent granted to us January 26, 1858, in which the distinguishing feature is a detached case or jacket surrounding the hydrant-stock and embedded in the ground, but more specifically in combining a case or jacket with a hydrant-stock, the said jacket being loosely fitted to said hydrant-stock, and adapted to have end play to compensate for the heaving by frost, sliding both at top and bottom, and keeping a dead-air space between said hydrant-stock and jacket; further, in so forming and connecting the loose case or jacket above specified that it extends above the surface of the ground, and conforms to the general outline of the hydrant itself, and may be driven back to place upon the elbow at bottom when the frost has expended its force.

The object of this invention is to provide a frost-jacket so fitted to the hydrant that it may have end-play by means of slip-joints both at top and bottom to compensate for heaving by frost, and so fitted to the hydrant that when the stock is removed from the elbow at bottom for repairs no gravel, dirt, mud, &c., can find its way into said elbow to injure the valves, &c., since the jacket forms a practically close sliding joint with the flange on the elbow at the bottom and extends to or above the ground at top.

In the drawings, Figure 1 is a sectional elevation of the improved hydrant, and Fig. 2 is a horizontal cross-section of same.

A indicates the hydrant proper, the part *a* being above ground and the stock *b* being below the same, and inclosed within the casing or jacket B. The loose case or jacket B, which surrounds the hydrant-stock, is made of graceful cylindrical outline, so as to conform to the general symmetry of the hydrant, and made to slide upon the hydrant at the top of the hydrant-stock *b*, and also at the bottom upon the hydrant-stock, or upon the elbow to which the stock is secured, and the end-play is limited by the shoulders G G′, respectively, at top and bottom. This case or jacket B rests upon the elbow C, and is centered by same through the agency of its flange *h*, and when heaved by frost it may be driven back again and rest upon the said elbow without displacement. The earth is filled in about the case or jacket B and elbow C at bottom, while the hydrant-stock itself is simply inclosed within said jacket. The lower end of the case preferably slides into a flange, *h*, of the elbow-connection C, and it may be centered to prevent axial turning by a sleeve or projection, *c*, which slides in groove D, formed in the flange *h*.

In the use of this hydrant the earth is not filled clear to the top of the loose case, but the latter projects up to such an extent that it may be driven back to place when the frost has expended its force. The position of the parts, of course, will be indicated at the top to the eye. By this arrangement the heaving action is expended entirely upon the outside case, and can in no wise affect the hydrant. The heaving by frost is a constant source of trouble and expense in hydrants by causing the elbows at the bottom, connecting with the "main," to break; also throwing the hydrant itself out of position. We aim to remedy this difficulty by giving the desired end-play, and at the same time by extending the case above the surface enable it to be driven back to place without difficulty.

These hydrants can be set at various heights above sidewalks, accommodating them to the different gradings without losing their symmetrical appearance. This is owing to the fact that the loose case projecting above presents the same graceful appearance as the hydrant itself.

Having now described the invention, what is claimed as the invention of the said WASHBURN RACE and myself is—

1. The detached case or jacket B, combined with a hydrant to have end-play or vertical motion, to compensate for heaving by frost, the said case B forming a comparatively close sliding joint with the hydrant both at top and bottom, the upper part of same passing outside of the main stock of hydrant, so that any change in its position can be easily ascertained and the case driven back to its place without disturbing the hydrant.

2. The detached case or jacket B, combined and arranged with a hydrant to have end-play or vertical motion, to compensate for heaving by frost, the said case B closely surrounding the hydrant at the bottom and supported by the main elbow, and the upper part of same passing outside of the main stock of hydrant, so that any change in its position can be easily ascertained and the case driven back to its place without disturbing the hydrant, substantially as set forth.

3. As an improvement on the detached case or jacket surrounding the hydrant-stock shown and described in the former patent of Race and Mathews, dated January 26, 1858, No. 19,206, the case B forming a comparatively close sliding joint both at top and bottom, and made shorter than that portion of the hydrant-stock upon which it is to have end-play, and so that such case shall have a range for vertical motion upon said hydrant-stock, substantially as and for the purpose specified.

In testimony of which invention we hereunto set our hands.

NANCY RACE,
*Administratrix, &c., of Washburn Race, deceased.*

Witnesses:
C. H. DAVID,
N. H. GILBERT.

SAMUEL R. C. MATHEWS.

Witnesses:
R. M. HUNTER,
R. S. CHILD, Jr.